United States Patent [19]

Koga et al.

[11] 4,185,158
[45] Jan. 22, 1980

[54] APPARATUS FOR ELECTRIC FURNACE CAPABLE OF EFFECTING ELECTRODE CONNECTION AND REFRACTORY LINING REPAIRS INDEPENDENTLY OF EACH OTHER

[75] Inventors: Minoru Koga, Nanpeidai; Yoshio Yanagi, Matsudo, both of Japan

[73] Assignee: Ishikawajima-Harima Jukogyo Kabushiki Kaisha, Tokyo, Japan

[21] Appl. No.: 860,942

[22] Filed: Dec. 15, 1977

[30] Foreign Application Priority Data

Dec. 20, 1976 [JP] Japan .................................. 51-153060
Oct. 11, 1977 [JP] Japan .................................. 52-121692

[51] Int. Cl.² .......................... H05B 7/14; F27D 1/16
[52] U.S. Cl. .............................. 13/18 C; 403/DIG. 5; 13/35
[58] Field of Search .............. 13/18, 1, 18 C; 266/281; 403/DIG. 5, 296

[56] References Cited

U.S. PATENT DOCUMENTS

| | | | |
|---|---|---|---|
| 1,125,741 | 1/1915 | Schwarz | 266/281 X |
| 1,507,862 | 9/1924 | Sheldon | 266/281 X |
| 1,876,734 | 9/1932 | Neuhauss | 266/281 X |
| 3,795,753 | 3/1973 | Mori et al. | 13/18 C |
| 3,796,818 | 3/1974 | Yuasa et al. | 13/18 C |
| 3,937,867 | 2/1976 | Wynne | 13/18 |
| 4,044,199 | 8/1977 | Simon | 13/18 C |

Primary Examiner—Roy N. Envall, Jr.
Attorney, Agent, or Firm—Scrivener, Parker, Scrivener & Clarke

[57] ABSTRACT

An apparatus for an electric furnace capable of effecting electrode connection and refractory lining repairs independently of each other. Mounted on a common supporting member are an electrode connecting device for suspending a new electrode and a refractory lining repairing device having a revolvable nozzle for blowing the refractory lining patching mixture against the eroded cavities in the lining in such a way that they may be traversed along the supporting member independently of each other. The new electrode suspended by the electrode connecting device is rotated whle being lowered so as to be screwed into the consumed electrode. The eroded refractory lining is repaired with the refractory lining repairing device.

4 Claims, 8 Drawing Figures

APPARATUS FOR ELECTRIC FURNACE CAPABLE OF EFFECTING ELECTRODE CONNECTION AND REFRACTORY LINING REPAIRS INDEPENDENTLY OF EACH OTHER

DETAILED DESCRIPTION OF THE INVENTION

In the manufacture of electric furnace steel, a consumed electrode must be spliced or connected with a new electrode, and the refractory lining patching mixture must be blown against the refractory lining of an electric furnace in order to repair eroded cavities therein.

The present invention relates to an apparatus for splicing or connecting a consumed electrode in an electric furnace with a new electrode combined with an apparatus for repairing the refractory lining of the furnace.

With the ever increasing in capacity of electric furnaces, electrodes larger in diameter are used. In order to splice or connect a new electrode to a consumed electrode, the new electrode is lifted and transported by a crane and spliced or connected manually to the consumed electrode. However an optimum tightening torque cannot be manually produced and with an electrode larger in diameter the manual tightening is almost impossible. As a result, the breakage of electrodes tends to occur very often.

In order to repair the eroded refractory lining of an electric furnace, it has been customary to manually place a refractory lining patching mixture blowing pipe into the furnace so as to blow the patching mixture against the eroded cavities in the refractory lining. However a substantial part of the refractory lining exists within a large dead angle when viewed from an operator so that the blowing operation must be carried out mainly based upon a sixth sense and experiences of the operator. Furthermore the patching operation has been hazardous to the health of the operator because of high temperature and dust and fume rising from the furnace.

Therefore there has been a strong demand not only for an apparatus capable of easily connecting a new large-diameter electrode to a consumed electrode with an optimum tightening torque in order to avoid the breakage or rupture of the spliced or joined electrodes but also for an apparatus which may permit the positive reliable and efficient repairs of the eroded refractory lining, whereby the safety of the furnace repair may be ensured and the saving in labor may be attained.

The primary object of the present invention is therefore to provide an apparatus capable of not only splicing electrodes but also repairing the electric furnace in the manner described above.

Another object of the present invention is the mechanization of the electrode connection as well as the furnace repair, whereby the working conditions may be improved, the safety may be ensured, the connection and repair time may be reduced and the saving in labor may be attained.

A further object of the present invention is to provide an apparatus which may automatically move not only a device for connecting a new electrode to a consumed electrode (to be referred as "the electrode connecting device" in this specification) but also a device for repairing a refractory lining (to be referred as "the refractory lining repairing device" in this specification) without the help of operators so that the rapid yet reliable electrode connecting and furnace repairing operations may be attained.

A yet further object of the present invention is to provide an apparatus of the type described above and in which the movements of the electrode connecting device and the refractory lining repairing device may be effected without any interference therebetween so that the electrode connecting and furnace repair operations may be effected smoothly.

The above and other objects, features and advantages of the present invention will become more apparent from the following description of preferred embodiments thereof taken in conjunction with the accompanying drawings, in which:

Figure 1:
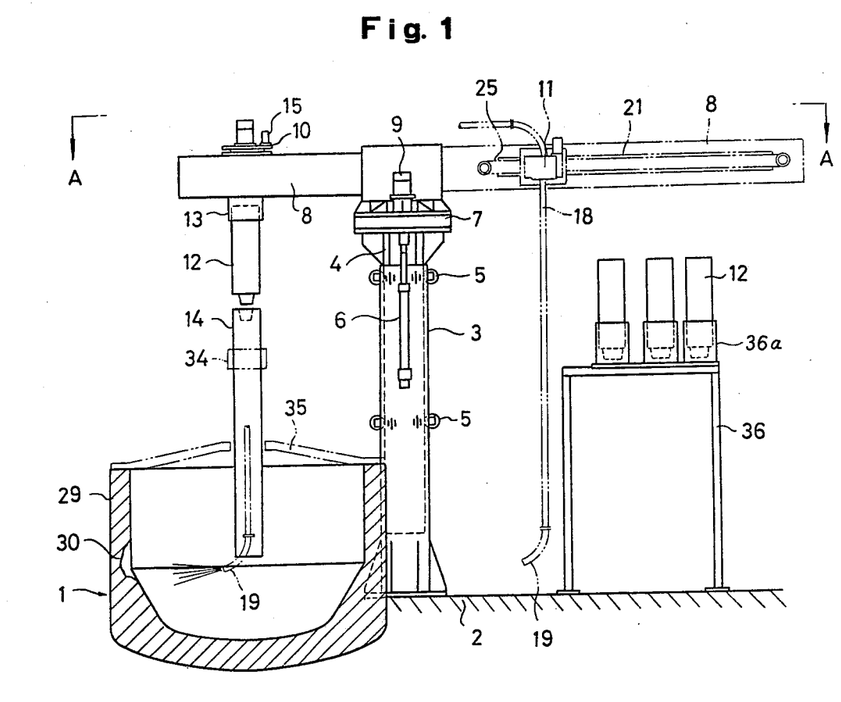
FIG. 1 is a schematic side view of a first embodiment of the present invention.
Figure 2:
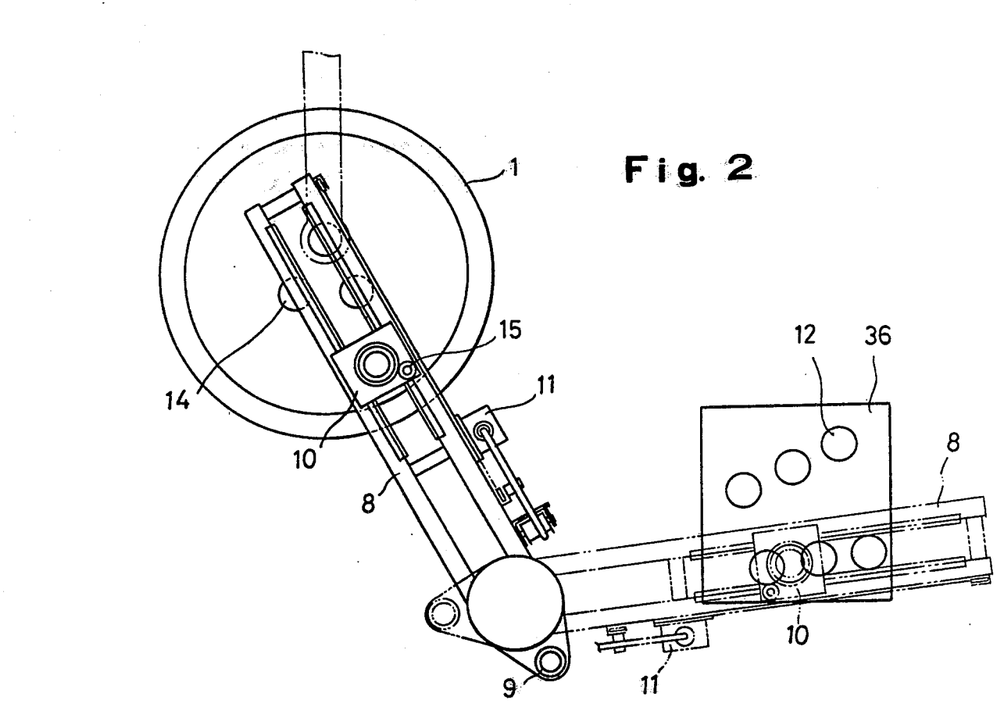
FIG. 2 is a top view thereof looking in the direction indicated by the arrows A in FIG. 1.
Figure 3:
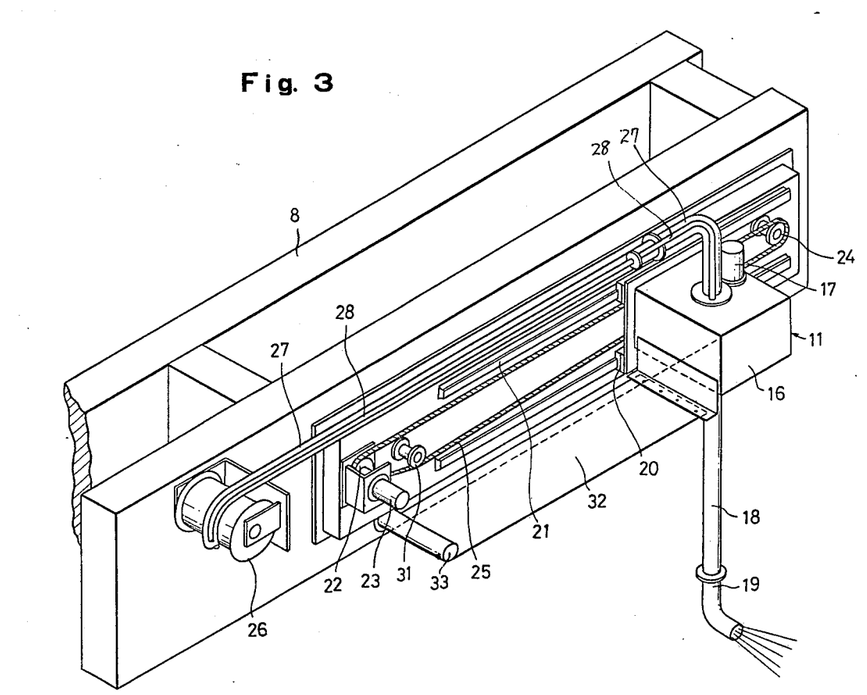
FIG. 3 is a perspective view, on enlarged scale, of a refractory lining repairing device of the first embodiment.

First Embodiment, FIGS. 1, 2 and 3

Referring to FIGS. 1, 2 and 3, a fixed post 3 is erected upright on a floor 2 adjacent to a shell 1 of an electric furnace, and an extendable post 4 with guide rollers 5 is mounted on the fixed post 3 for vertical movement by a lift unit such as a hydraulic cylinder 6 interconnected between the fixed and extendable posts 3 and 4. A pivot bearing 7 is attached to the top of the extendable post 4, and one end of an arm 8 or a supporting member is securely attached to the bearing 7. Therefore the arm 8 may be vertically moved upward or downward in unison with the extendable post 4. An arm revolving mechanism or unit 9 is mounted on the bearing 7 for rotating the arm 8 about the axis of the extendable post 4.

An electrode connecting device generally indicated by the reference numeral 10 is mounted on the top of the arm 8 for the movement in the longitudinal direction thereof. In like manner, a refractory lining repairing device generally indicated by the reference numeral 11 is mounted on one side of the arm 8 for the movement in the longitudinal direction thereof as will be described in detail hereinafter.

The electrode connecting device 10 comprises an electrode holding or suspending unit 13 and a tightening unit (not shown) for rotating the electrode holding unit 13 so that a new electrode 12 held thereby may be threadably engaged with a consumed electrode 14 as will be described hereinafter. The electrode connecting device 10 has pinions which are in mesh with racks or tracks on top of the arm 8 and which are driven by a drive unit 15 in the longitudinal direction of the arm 8.

In FIG. 3 there is shown in detail the refractory lining repairing device 11 which has a main body 16 including a drive motor 17 for driving a gear train (not shown) which is housed within the main body 16. A patching mixture feed pipe 18 is extended downward from the main body 16 and a nozzle 19 for blowing the patching mixture against the refractory lining is attached to the lower end of the feed pipe 18. Guide blocks 20 at the rear side of the main body 16 are made into slidable engagement with parallel guide rails 21 or tracks securely attached to one side of the arm 8 so that the main body 16 with the suspended feed pipe 18 and the nozzle 19 may be moved in the longitudinal direction of the arm 8. More particularly, a pair of horizontally spaced driving and driven sprockets 22 and 24 are rotatably mounted on one side of the arm 8, and a tension sprocket 31 is attached between the driving and driven sprockets 22 and 24. An endless chain 25 passes these driving, driven and tension sprockets 22, 24 and 31 (and is made fast to the main body 16). A brake motor 23 with a reduction gear is drivingly coupled to the driving sprocket 22 so that upon rotation of the motor 23 the main body 16 may move along the guide rails 21 lengthwise of the arm 8.

A rotary drum 26 is rotatably mounted on one side of the arm 8 between the driving sprocket 22 and the fixed end of the arm 8 and serves as a guide for flexible pipes 27 and 28 which are extended in parallel with the arm 8 and joined to the feed pipe 18 in the main body 16. The refractory lining patching materials are supplied through the flexible pipe 27 while the water is supplied through the pipe 28 and mixed with the patching materials so that the refractory lining patching mixture flows through the feed pipe 18 and is blown through the nozzle 19 against an eroded cavity 30 in a refractory lining 29 of the furnace shell 1 as best shown in FIG. 1. Since the rotation of the motor 17 mounted on the main body 16 is transmitted through the gear train to the feed pipe 18, the nozzle 19 may be revolved about the axis of the feed pipe 18.

Still referring to FIG. 3, one end of a thermal radiation shielding sheet 32 for thermally shielding the radiant heat from the furnace shell 1 is made fast to the main body 16 while the other end is made fast to a rotary drum 33 attached to one side of the arm 8 in such a way that the thermal radiation shielding sheet 32 may be wound around the drum 33 or unwound therefrom as the main body 16 moves toward or away from the drum 33.

Referring back to FIGS. 1 and 2, the consumed electrode 14 to be spliced or connected with the new electrode 12 is supported by an electrode supporting unit 34 above a furnace roof 35 during the connecting operation. New electrodes 12 are stored in rack 36a on a pallette 36.

Next the mode of connecting the new electrode 12 to the consumed electrode 14 will be described. First the arm revolving unit 9 is energized to rotate the arm 8 so that the free end thereof may be brought to the position immediately above the electrode pallette 36. Concurrently the driving or power unit 15 is energized so that the electrode connecting device 10 may be moved along the arm 8 to the position immediately above the electrode pallette 36. Next the lifting unit 6 is energized so as to retract or lower the extendable post 4 and hence the arm 8 in such a way that the electrode holding unit 13 may hold and suspend a new electrode 12 on the pallette 36. Thereafter the lifting unit 6 is energized again to extend or raise the extendable post 4 and hence the arm 8 so that the new electrode 12 is held and suspended by the electrode holding unit 13. The arm 8 is rotated and the electrode connecting device 10 is driven toward the position immediately above the furnace shell 1 in such a way that the new electrode 12 suspended may be in line with the consumed electrode 14 securely supported by the supporting member 34. The extendable post 4 and hence the arm 8 are lowered so that the new and consumed electrodes 12 and 14 may be more correctly aligned with each other with the aid of a suitable jig or the like. As the new electrode 12 is lowered, it is rotated by the tightening unit (not shown) so as to be threadably engaged with the consumed electrode 14. After the new and consumed electrodes 12 and 14 have been securely connected to each other, the electrode holding unit 13 releases the new electrode 12, and the electrode connecting device 10 is raised.

During the operation for connecting the new and consumed electrodes 12 and 14 in the manner described above, the refractory lining repairing device 11 is retracted and held in an inoperative position close to the fixed end of the arm 8 so that the feed pipe 18 and the nozzle 19 may be prevented from interferring with the furnace roof 35.

Next the mode of operation for repairing the eroded refractory lining will be described. During the operation the refractory lining 29 of the furnace shell 1 is subjected to high temperatures and the molten steel which is caused to flow by the electromagnetic forces produced between the electrode 14. First the extendable arm 4 and hence the arm 8 and the refractory lining repairing device 11 are lifted while the arm 8 is rotated so that the nozzle 19 may be positioned immediately above the furnace shell 1. During the repair of the refractory lining, the furnace roof 35 must be removed. In order to avoid the adverse effects on the electrode connecting device 10 by the radiant heat from the furnace shell 1, the device 10 is retracted and held in an inoperative position close to the the fixed end of the arm 8. The arm 8 and hence the repairing device 11 are lowered so that the nozzle 19 at the lower end of the feed pipe 18 may be correctly aimed at the eroded cavity 30 in the refractory lining 29. This is done by the motors 17 and 23 (See FIG. 3). That is, the nozzle 19 may be moved toward or away from the refractory lining 29 as the brake motor 23 drives so as to displace the main body 16 of the repairing device 11 along the arm 8 in the manner described above. The nozzle 19 may be also revolved as the feed pipe 18 is rotated by the motor 17 mounted on the main body 16.

After the nozzle 19 has been set to the desired position in the manner described above, the refractory lining patching materials (for instance, dolomite and magnesia) are supplied through the pipe 27 and mixed with the water supplied through the pipe 28, and the patching mixture thus prepared is blown through the nozzle 19 against the reroded cavity 30 in the refractory lining 29. During the repair operation, the radiation shielding sheel 32 is extended to avoid the repairing device 11 from being unnecessarily exposed to the radiant heat from the furnace shell 1. After the refractory lining 29 has been repaired in the manner described above, the extendable post 4 is lifted so as to move upward the arm 8 and consequently to drawn the nozzle 19 out of the furnace shell 1. Thereafter the furnace roof 35 is returned to its initial or operative position.

In the first embodiment, the rack and pinion mechanism is used to control the movement of the electrode connecting device 10, but it will be understood that any suitable mechanisms may be employed as far as the device 10 may be stopped with a desired accuracy. Furthermore the electrode connecting device 10 may inculde a device for permitting the new electrode 12 to be held at an angle to the vertical so that it may be connected to the consumed electrode 14 which is inclined at an angle to the vertical.

Figure 4:
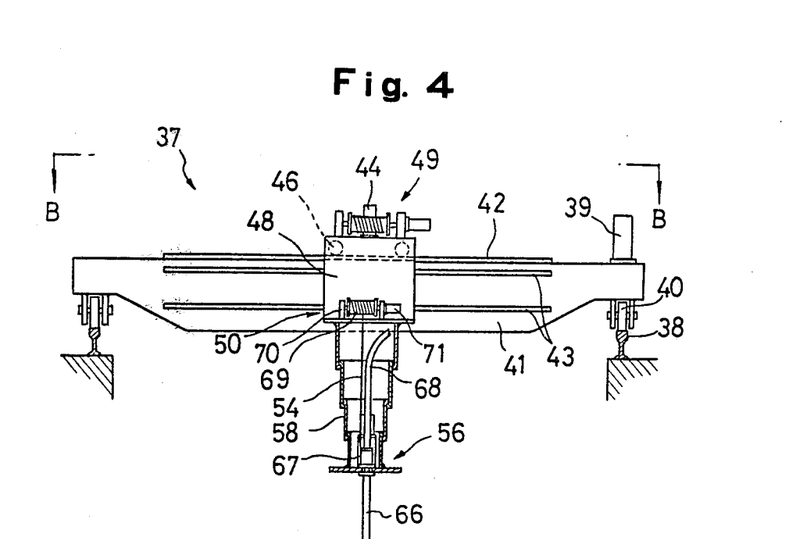
FIG. 4 is a side view of a second embodiment of the present invention.
Figure 5:
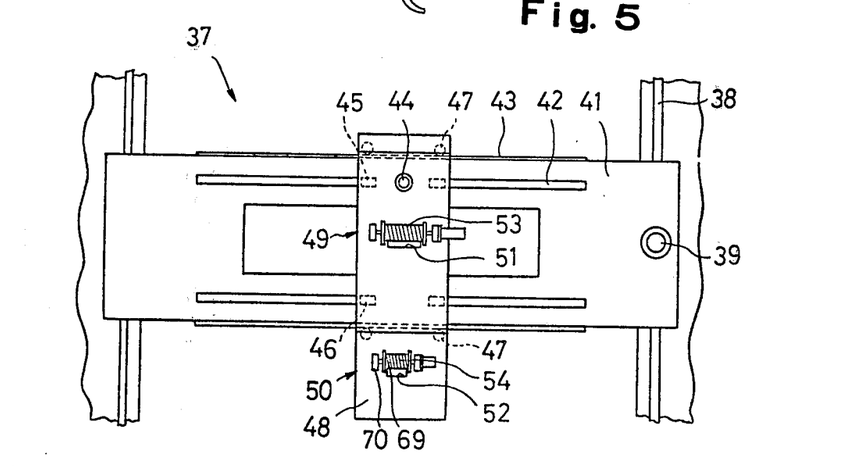
FIG. 5 is a top view thereof looking in the direction indicated by the arrows B in FIG. 4.
Figure 6:
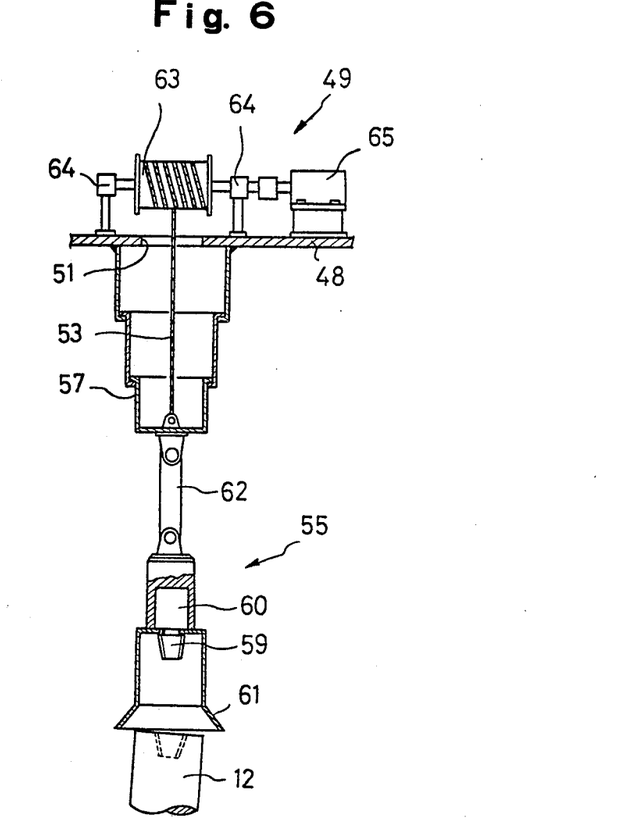
FIG. 6 is a side view, partly in section and on enlarged scale, of an electrode connecting device thereof.

SECOND EMBODIMENT, FIGS. 4, 5 and 6

Referring to FIGS. 4, 5 and 6, the second embodiment of the present invention includes an overhead crane generally indicated by the reference numeral 37. The overhead crane 37 is composed of a box girder 41 which is a supporting member and which is supported at the ends by trucks with wheels 40 which ride over runway rails 38 and are driven by a power unit 39. A trolley 48 which is mounted on the top of the box girder 41 has wheels 45 and 46 which ride on rails 42 laid on the top of the box girder 41 and wheels 47 which ride on rails 43 laid on the side walls of the box girder 41. Therefore the trolley 48 may move on the box girder 41 in the longitudinal direction thereof or the transversely of the runway rails 38.

Mounted on the trolley 48 are a hoisting unit 49 for an electrode connecting device 55 and a hoisting unit 50 for a refractory lining repairing device 56. That is, the electrode connecting device 55 is suspended by a wire rope 53 extended from the hoisting unit 49 through an opening 51 formed through the trolley 48. In like manner, the lining repairing device 56 is suspended by a wire rope 54 extended from the hoisting unit 50 through an opening 52 formed through the trolley 48. More particularly the electrode connecting device 55 is connected to the lower end of a telescopic guide pipe assembly 57 the upper end of which is securely attached to the undersurface of the trolley 48. In like manner the refractory lining repairing device 56 is connected to the lower end of a telescopic guide pipe assembly 58 the upper end of which is securely attached to the undersurface of the trolley 48. The electrode connecting device 55 and the refractory lining repairing device 56 are spaced apart from each other by a suitable distance traversely of the box girder 41 or in the direction parallel with the runway rails 38 and are vertically movable as will be described in detail hereinafter.

FIG. 6, there is shown in detail the construction and arrangement of the electrode connecting device 55 which comprises an electrode nipple 59 for threadable engagement with a new electrode 2, a screw tightening unit 60 for rotating the electrode nipple 59 so as to threadably engage it with the electrode 12, an electrode guide pipe 61 with a diverging skirt portion which is used for establishing the alignment between the electrode nipple 59 and the electrode 12 and a universal joint 62 the upper end of which is securely joined to the lower end of the telescopic guide pipe assembly 57. Therefore the swinging and rotation of the electrode connecting device 55 is limited by the telescopic guide pipe assembly 57 which in turn is extended or retracted by the wire rope 53 unwound from or wound around a hoisting drum 63. The drum 63 is rotatably supported by bearings 64 and is drivingly coupled to a power unit 65 mounted on the trolley 48.

Referring back to FIGS. 4 and 5, the refractory lining repairing device 56 comprises a nozzle 66 for blowing the patching mixture (consisting of, for example, dolomite, magnesia and water) against the eroded cavities in the refractory lining of the furnace shell as in the case of the first embodiment, a nozzle revolving unit 67 for revolving the nozzle 66 and a feed hose 68 having one end joined to the nozzle 66 and the other end jointed to a patching mixture supply source (not shown). The upper end of the refractory lining repairing device 56 is securely attached to the lower end of a telescopic guide 58 the upper end of which is securely attached to the undersurface of the trolley 48. Therefore the swinging and rotation of the refractory lining repairing device 56 is limited by the telescopic guide 58 which in turn is extendable or retractable by the wire rope 54 unwound from or wound around a hoisting drum 69 which in turn is rotatably supported by bearings 70 and drivingly coupled to a power unit 71 mounted on the trolley 48.

As described above the electrode connecting device 55 and the refractory lining repairing device 56 are spaced apart from each other by a suitable distance in the direction parallel with the runway rails 38 and suspended from the trolley 48 movable lengthwise of the box girder 41.

Next the electrode connecting operation of the second embodiment will be described. The power units 39 and 44 are energized so that the box girder 41 is traversed along the runway rails 38 while the trolley 48 along the box girder 41 in such a way that the electrode connecting device 55 may be immediately positioned above the electrode 12 in the rack on the pallette (See FIG. 1). Next the power unit 65 is energized so that the wire rope 53 may be unwound from the drum 63. As a result the telescopic guide 57 is extended downward so that the electrode connecting device 55 is lowered while the electrode nipple 59 and the new electrode 12 are aligned with the aid of the guide pipe 61 and the universal joint 62. Thereafter the tightening unit 60 is actuated to rotate the electrode nipple 59 while the electrode connecting device 55 is being lowered so that the nipple 59 may be screwed into an internally threaded mating hole of the new electrode 12. The reaction force generated when the electrode nipple 59 is screwed into the electrode 12 is received through the telescopic guide 57, the wheels 45, 46, 47 and the rails 42, 43 by the box girder 41.

After the electrode nipple 59 and the new electrode 12 have been securely joined to each other in the manner described above, the power unit 65 is actuated to wind the wire rope 53 around the hoisting drum 63 so that the electrode connecting device 55 is lifted away from the electrode pallette and the new electrode 12 is removed out of the rack. The box girder 41 and the trolley 48 are so traversed that the new electrode 12 suspended from the electrode connecting device 55 may be brought to the position immdiately above a consumed electrode extended through the furnace roof and securely held in position by the electrode supporting device. Thereafter the wire rope 53 is unwound from the drum 63 so that the electrode connecting device 55 is lowered. While the new electrode 12 is lowered, it is correctly aligned with the consumed electrode with the aid of the universal joint 62 and a suitable jig or the like and after the new and consumed electrodes have been correctly aligned, the tightening unit 60 is actuated again to rotate the new electrode 12 so as to make it into threadable engagement with the consumed electrode. After the new and consumed electrodes have been securely connected to each other, the tightening unit 60 is actuated so as to rotate the electrode nipple in the opposite direction while the new electrode is firmly held stationary. Then the electrode nipple 59 is removed or unscrewed from the new electrode 12. Thereafter the power unit 65 is actuated again so as to wind the wire rope 53 around the hoisting drum 63 so that the electrode connecting device 55 is lifted away from the new electrode 12 which is now connected to the consumed electrode extended through the furnace roof.

During the electrode connecting operation, the refractory lining repairing device 56 is retracted to and held in an inoperative position close to the undersurface of the box girder 41 in order to avoid the interference of the nozzle 66 with the furnace roof.

Next the mode of refractory lining repair will be described. First the electrode connecting device 55 is retracted to an inoperative or raised position close to the undersurface of the box girder 41, and then the wire rope 54 is wound around the hoisting drum 69 to raise the refractory lining repairing device 56 while the box girder 41 and the trolley 48 are so traversed that the nozzle 66 of the repairing device 56 may be brought to the position immediately above the electric furnace roof. Then the roof is removed from the furnace shell, but the electrode connecting device 55 may be prevented from being adversely affected by the radiant heat from the furnace shell as it is retracted in the inoperative position and is spaced apart from the repairing device 56 in the manner described above.

Next the power unit 71 is actuated so as to cause the hoisting drum 69 to unwind the wire rope 54 so that the telescopic guide is extended and consequently the refractory lining repairing device 56 is lowered. The power units 39 and 44 and the nozzle revolving unit 67 are slidably actuated so that the nozzle 66 may be correctly directed to an eroded cavity in the refractory lining of the furnace shell. The reaction force generated when the nozzle is revolved is received by the box girder 41 in the manner described above. After the nozzle has been correctly positioned, the patching mixture is fed through the feed house 68 and is blown through the nozzle 66 against the eroded cavity to fill it. After the refractory lining of the shell is repaired in the manner described above, the power unit 71 is actuated so as to cause the hoisting drum 69 to wind the wire rope 54 therearound. The telescopic guide 58 is retracted so that the refractory lining repairing device 56 is lifted and the nozzle 66 is drawn out of the furnace shell. Thereafter the roof is returned to the initial or operative position to cover the furnace shell. Thus the refractory lining repair is completed.

Figure 7:
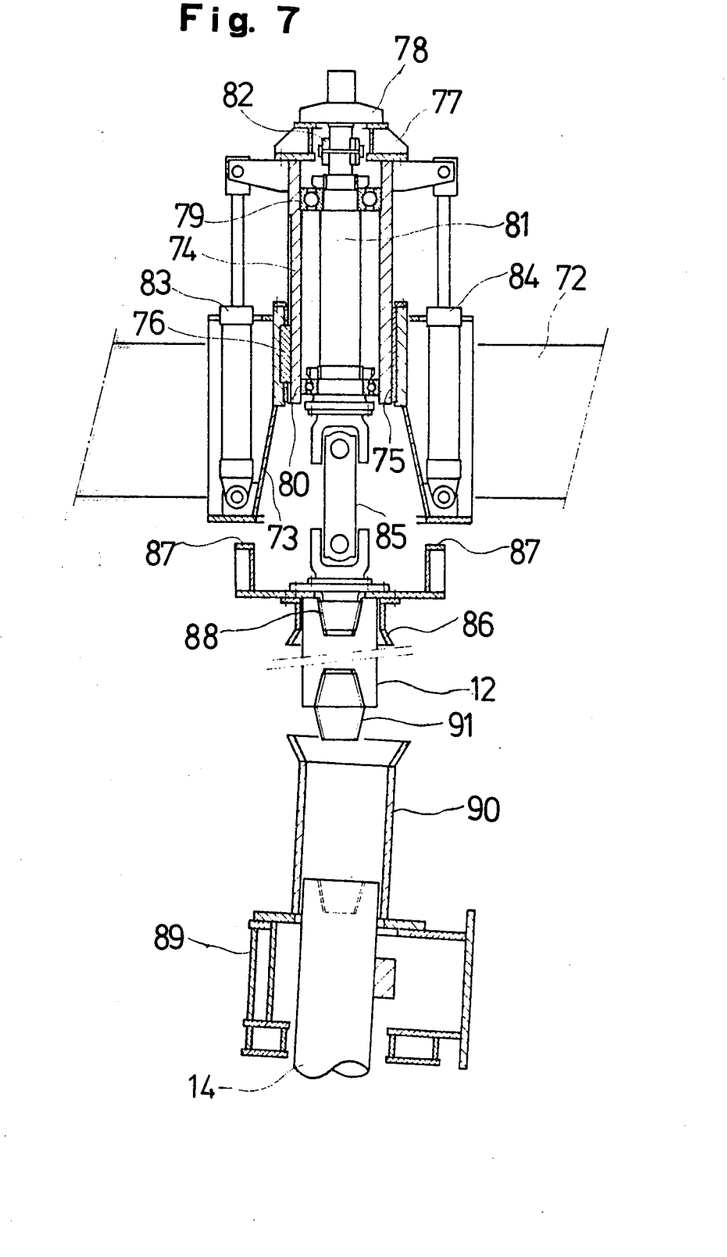
FIG. 7 is a side view, partly in section, of a modification of the electrode connecting device shown in FIG. 6.
Figure 8:
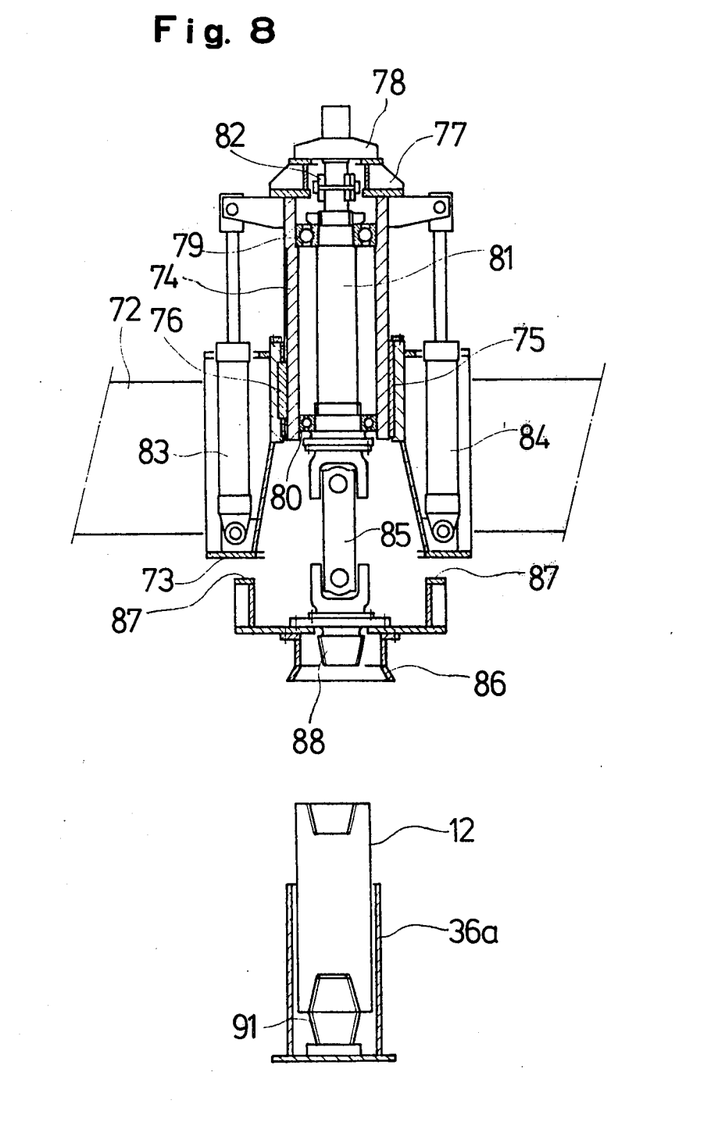
FIG. 8 is a view similar to FIG. 7 which is used for the explanation of the mode of connecting a new electrode to the electrode connecting device.

THIRD EMBODIMENT, FIGS. 7 and 8

Referring to FIGS. 7 and 8, a modification of the electrode connecting device will be described. A frame 73 is mounted on an arm 72 for movement in the longitudinal direction thereof, the arm 72 being similar in construction and mode of operation to the arm 8 of the first embodiment shown in FIG. 1. A cylindrical slider 74 is vertically movably fitted into a center opening of the frame 73 through a bushing 75 and is engaged with a key 76 so that the rotation of the slider 74 may be prevented. A hydraulic motor 78 is mounted on top of the slider 74 with brackets 77 and is drivingly coupled through a coupling 82 to a shaft 81 extended through the slider 74 coaxially thereof and rotatably supported by a pair of vertically spaced bearings 79 and 80. Hydraulic cylinders 83 and 84 are pivoted to the frame 73 on both sides thereof and have their piston rods pivoted to the upper end of the slider 74 so that upon extension or retraction of the hydraulic cylinders 83 and 84, the slider 74, the hydraulic motor 78, and the shaft 81 may be extended upward or retracted downward. The upper end of a universal joint 85 is securely attached to the lower end of the shaft 81 while the lower end is securely joined to an electrode nipple 88 formed integral with a downwardly extended guide pipe 86 and an upwardly extended stopper 87 for engagement with the lower end of the frame 73. Therefore upon rotation of the hydraulic motor 78, the rotation is transmitted through the opening 82, the shaft 81 and the universal joint 85 to the electrode nipple 88 so that the latter is rotated. Furthermore when the hydraulic cylinders 83 and 84 are extended or retracted, the electrode nipple 88 is raised or lowered together with the hydraulic motor 78, the slider 74, the shaft 81 and the universal joint 85. Therefore the tightening torque is produced by the combination of the rotation and downward movement of the electrode nipple 88, and since the electrode nipple 88 is connected through the universal joint 85 to the shaft 81, the angular position of the electrode nipple 88 may be arbitarily changed.

The consumed electrode 14 extended through the furnace roof is supported by an electrode supporting device 89 which may be raised or lowered by an elevating means (not shown). A funnel-shaped guide pipe 90 is extended upward from the electrode supporting device 89 coaxially of the consumed electrode 14 supported by the device 89. An electrode connection nipple 91 is screwed into the lower end of the new electrode 12 stored in the rack 36a. When the new electrode 12 is aligned with the guide pipe 90, it is inserted into the pipe 90 and joined to the consumed electrode as will be described below.

Next the mode of operation of this electrode connecting device will be described. The arm 72 is rotated while the electrode connecting device is traversed along the arm 72 so that the electrode connecting device may be positioned immediately above the electrode rack 36a in the manner described in conjunction with the first embodiment. In this case, the hydraulic cylinders 83 and 84 are kept actuated so as to keep the stopper 87 in abutment with the lower end of the frame 73, thereby avoiding vibrations of the universal joint 85. When the electrode connecting device has been brought to the position immediately above the electrode rack 36a, the hydraulic cylinders 83 and 84 are retracted so that the slider 74 is lowered along the bushing 85. Concurrently the hydraulic motor 78 is actuated to rotate the shaft 81. As a result the electrode nipple 88 connected through the universal joint 85 to the shaft 81 is lowered while being rotated. When the outwardly diverged skirt portion of the guide pipe 86 is made in contact with the upper end of the new electrode 12 in the rack 36a, the electrode nipple 88 and the new electrode 12 may be automatically aligned with each other because of the action of the universal joint 85. The electrode nipple 88 is screwed into an internally threaded mating hole at the upper end of the new electrode 12 so that they are firmly connected to each other. Thereafter the hydraulic motor 78 is deactivated while the hydraulic cylinders 83 and 84 are extended so that the slider 74 and hence the electrode nipple 88 are raised and the new electrode 12 is removed out of the rack 36a and suspended by the electrode nipple 88.

Thereafter the arm 72 is rotated while the electrode connecting device is traversed along the arm 72 in such a way that the electrode connecting device may be positioned immediately above the furnace shell 1 (See FIG. 1). Then the hydraulic cylinders 83 and 84 are retracted while the hydraulic motor 78 is actuated again so that the new electrode 12 suspended from the electrode nipple 88 is lowered while being rotated. When the lower end of the new electrode 12 is made into contact with the outwardly diverging skirt portion at the top of the guide pipe 90, the new and consumed electrodes 12 and 14 are automatically aligned with each other because of the action of the universal joint 85 while the new electrode 12 is inserted into the guide pipe 90. Therefore the electrode nipple 91 at the lower end of the new electrode is screwed into an internally threaded mating hole at the upper end of the consumed electrode 14 so that the new and consumed electrodes are securely connected to each other. After the new and consumed electrodes have been securely joined to each other, the electrode supporting device 89 releases the command electrode 14 and then is raised by the elevating means (not shown) so as to firmly support and hold the new electrode 12 joined to the consumed electrode 14. Thereafter the hydraulic cylinders 83 and 84 are extended while the hydraulic motor 78 is rotated in the opposite direction so that the electrode nipple 88 is loosened and disconnected from the new electrode 12. After the electrode nipple 88 has been released from the electrode 12, the hydraulic motor 78 is deactivated while the hydraulic cylinders 83 and 84 are further extended until the stopper 87 is made into contact with the lower end of the frame 73 and then are deactivated.

Instead of the hydraulic cylinders 83 and 84 and the hydraulic motor 78, any other suitable means capable of accomplishing the same effects may be employed. Furthermore instead of mounting the electrode connecting device on the arm 72, it may be mounted on the trolley 48 shown in FIG. 4.

The advantages of the electrode connecting apparatus combined with the refractory lining repairing device may be summarized as follows:

(1) Both the electrode connecting device and the refractory lining repairing device may be traversed independently of each other and without any interferences therebetween. Therefore during the electrode connection, the repairing device may be retracted to an inoperative position so as to avoid the interference with the furnace roof. During the refractory lining repair, the electrode connecting device may be retracted to an inoperative position so as to avoid the adverse effects from the radiant heat from the furnace shell. Thus the electrode connecting operation and the furnace refractory lining repair may be accomplished in a very simple manner.

(2) Since the new and consumed electrodes are mechanically connected to each other an optimum tightening torque may be obtained so that the rupture of the electrodes may be avoided.

(3) The refractory lining repair may be also mechanically accomplished so that the repair efficiency may be considerably improved and the safety may be ensured.

(4) Because of (2) and (3), the working conditions may be improved, the safety may be ensured, the time required for electrode connection and refractory lining repairs may be reduced and the saving in labor may be attained.

(5) The electrode connecting device and hence the electrode and the refractory lining repairing device and hence the patching mixture may be automatically moved along the arm so that the rapid and reliable electrode connection or splice and refractory lining repairs may be ensured.

(6) The electrode connecting device and the refractory lining repair device may be mounted on the common trolley which in turn is mounted on the box girder so that the effective use of a space may be ensured and the safe and reliable electrode connection and refractory lining repairs may be ensured.

(7) The universal joint is incorporated in the electrode connecting device so that a new electrode may be automatically aligned with a consumed electrode. As a result, the electrode connecting operation may be much facilitated.

(8) Since the electrode connecting device includes the guide pipe, the alignment between a new electrode and the electrode nipple may be much facilitated even when the electrode is inclined at an angle to the vertical.

(9) Since the electrode supporting device for supporting a consumed electrode is also provided with the guide pipe, the alignment between the new and consumed electrodes may be much facilitated even when the consumed electrode is inclined at an angle to the vertical so that the electrode connecting operation may be much facilitated.

(10) The apparatus may be easily automated so that saving in labor may be ensured.

(11) The apparatus is very simple in construction and highly reliable and dependable in operation.

What is claimed is:

1. Apparatus for connecting a new furnace electrode to a consumed electrode mounted in the furnace comprising means for releasably holding a new electrode to be connected to the consumed electrode, means for rotating said holding means, means including a universal joint for interconnecting said holding means and rotating means, means for vertically moving said holding means and said rotating means to align the electrodes, and cooperating means carried by the new electrode and the consumed electrode to threadedly interconnect said electrode during rotation of said rotating means, said holding means and said new electrode.

2. Apparatus as set forth in claim 1 wherein said holding means includes guide means.

3. Apparatus as set forth in claim 1 including means for supporting a consumed electrode of said electric furnace, said supporting means being provided with guide means along which a new electrode is moved for connection with said consumed electrode.

4. Apparatus as set forth in claim 1 wherein said holding means includes a rotatable arm and a refractory lining repairing device mounted on said arm.

* * * * *